US011163771B2

(12) United States Patent
Konik et al.

(10) Patent No.: US 11,163,771 B2
(45) Date of Patent: Nov. 2, 2021

(54) DATABASE SEQUENCE OBJECT HAVING A DYNAMIC CACHE BLOCK SIZE (71) Applicant: International Business Machines Corporation, Armonk, NY (US)

(72) Inventors: Rafal P. Konik, Oronoco, MN (US); Robert J. Bestgen, Rochester, MN (US); Shawn J. Baranczyk, Rochester, MN (US); Roger A. Mittelstadt, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 16/120,895

(22) Filed: Sep. 4, 2018

(65) Prior Publication Data

US 2020/0073869 A1 Mar. 5, 2020

(51) Int. Cl.
*G06F 16/2455* (2019.01)
*G06F 16/2453* (2019.01)

(52) U.S. Cl.
CPC .. *G06F 16/24552* (2019.01); *G06F 16/24539* (2019.01)

(58) Field of Classification Search
None
See application file for complete search history.

(56) References Cited

U.S. PATENT DOCUMENTS

| 7,089,356 | B1* | 8/2006 | Chen | G06F 16/24532 |
| | | | | 711/113 |
| 9,141,609 | B2 | 9/2015 | Li et al. | |
| 9,355,128 | B2 | 5/2016 | Bestgen et al. | |
| 2017/0185645 | A1* | 6/2017 | Agarwal | G06F 12/0238 |

OTHER PUBLICATIONS

Disclosed Anonymously, "Differential resource allocation in a system containing a database", http://ip.com/IPCOM/000236009D, Apr. 2, 2014.
IBM, "Method for dynamically setting batch job memory resource requirements based on historical usage and user suggestion", http://ip.com/IPCOM/000179647D, Feb. 19, 2009.

* cited by examiner

*Primary Examiner* — Amresh Singh
(74) *Attorney, Agent, or Firm* — Alex Harvey (57) ABSTRACT A sequence object manager provides a sequence object with a dynamic cache block size that indicates a block size of values to be added to the sequence object when the cache values are exhausted. The dynamic block size allows the sequence object manager to optimize performance and storage space depending on applications using the sequence object. The dynamically block size is set and maintained by the sequence object manager based on observed performance and historical trends of the applications. A seed value may be provided by the user to initially set the dynamic block size.

17 Claims, 6 Drawing Sheets

User Job    128

(Query uses a sequence object (ORDER_SQE)
INSERT INTO ORDER (ORDERNO, CUSTONO)
VALUES (NEXT VALUE FOR ORDER_SEQ, 3456787)

FIG. 3B

| ORDERNO | CUSTONO |
|---|---|
| ... | ... |
| 24 | 123456 |
| 25 | 3456787 |
| ... | ... |

126
ORDER_SEQ
318 — 1-25
320 — 26-75

FIG. 3D

| Sequence Object Historical Information 129 | | | | |
|---|---|---|---|---|
| Job Type | Application | Reserved | Ave Number Used | Ave Number of New Sets |
| Interactive | Customers | 10 | 32 | 3 |
| Batch | Customers | 1000 | 1135 | 1 |
| Batch | Payroll | 100 | 320 | 3 |
| Interactive | Status | 100 | 9 | 0 |

DATABASE SEQUENCE OBJECT HAVING A DYNAMIC CACHE BLOCK SIZE

BACKGROUND

1. Technical Field

This disclosure generally relates to computer database systems, and more specifically relates to a system and method for a sequence object manager that provides a database sequence object with a dynamic cache block size.

2. Background Art

Many database applications use a structured query language (SQL). The SQL has SQL statements that are used to communicate with a database. SQL statements perform tasks such as update data on a database, or retrieve data from a database. SQL statements used by an application may include sequence objects. Sequence objects return a newly generated unique value with a NEXTVAL statement or a previously generated unique value with a CURRVAL statement in the structured query language. When a sequence object is created a cache number of values are created (default is 20 in some cases). The number of cache values to be carved out can be specified when the sequence object is created in the cache block size. The cache block size is a fixed number of values added to the cache each time the sequence objects are exhausted.

BRIEF SUMMARY

A sequence object manager provides a sequence object with a dynamic cache block size that indicates a block size of values to be added to the sequence object when the cache values are exhausted. The dynamic block size allows the sequence object manager to optimize performance and storage space depending on applications using the sequence object. The dynamic block size is set and maintained by the sequence object manager based on observed performance and historical trends of the applications. A seed value may be provided by the user to initially set the dynamic block size.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a system and method for a sequence object manager providing a sequence object with a dynamic cache block size that indicates a block size of values to be added to the sequence object when the cache values are exhausted. The dynamic block size allows the sequence object manager to optimize performance and storage space depending on applications using the sequence object. The dynamically block size is set and maintained by the sequence object manager based on observed performance and historical trends of the applications. A seed value may be provided by the user to initially set the dynamic block size.

Figure 1:
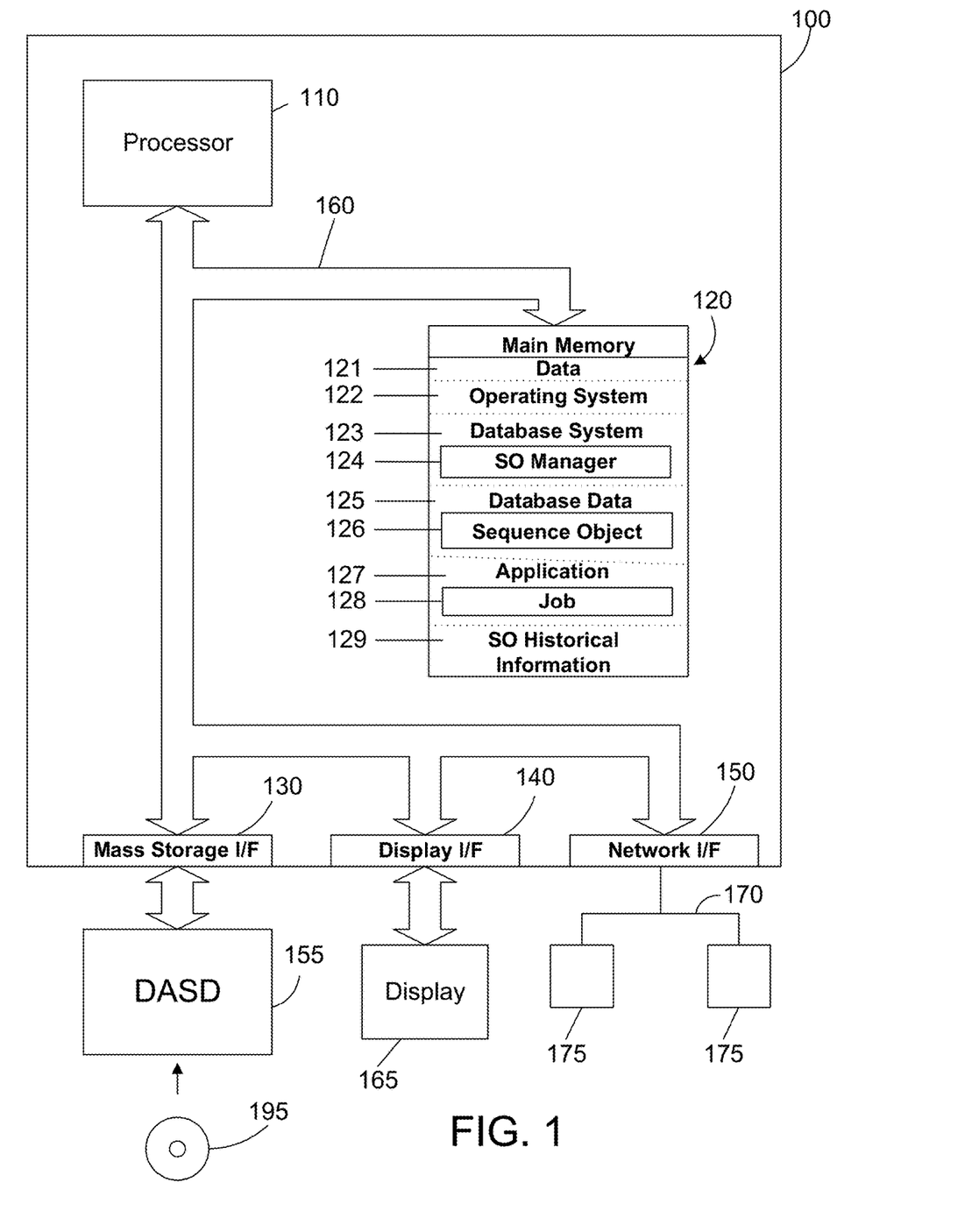
FIG. 1 is a block diagram a computer system with a sequence object manager that provides a sequence object with a dynamic cache block size.

Referring to FIG. 1, a computer system 100 is one suitable implementation of a computer system that is capable of performing the computer operations described herein including a sequence object manager that provides a sequence object with a dynamic cache block size as described herein. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains data 121 and an operating system 122. Operating system 122 is a multitasking operating system known in the industry as IBM i; however, those skilled in the art will appreciate that the spirit and scope of this disclosure is not limited to any one operating system. The memory 120 further includes a database system 123 with a sequence object manager 124. The memory 120 also includes database data 125 with a sequence object 126, an application 127 with a job 128 and historical information for sequence objects 129.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while data 121, operating system 122, database system 123, software object manager 124, database data 125, sequence object 126, application 127, job 128 and SO historical information 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122 and the database system 123 and later executes the program instructions that make up the application 127 and the job 128 as directed by a user.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
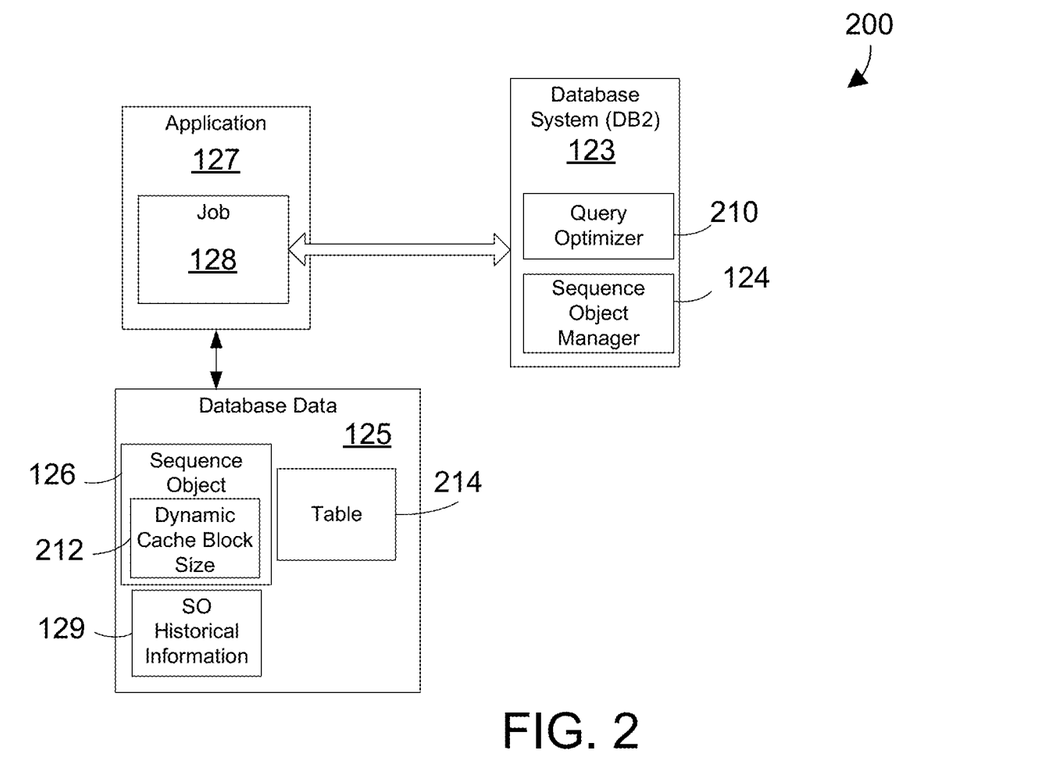
FIG. 2 illustrates another simplified block diagram of a system with a sequence object manager that provides a sequence object with a dynamic cache block size.

FIG. 2 illustrates a simplified example of a system 200 with a sequence object manager 124 and other software components residing in the memory and executing on the computer system 100 described above with reference to FIG. 1. The system 200 includes an application 127 with a job 128 that uses a database system 123 to access database data 125. In this example, the job 128 is part of the application 127 which creates the sequence object as described below. Alternatively, the job may be part of another application. The job 128 accesses the database data 125 using queries to the database system 123 similar to the manner known in the prior art. In this example, the database system is a DB2 system which is a relational database product by International Business Machines Corporation. The databases system 123 includes a query optimizer 210 for optimizing the SQL of the job 128. The database system further includes a sequence object manager 124 that provides a sequence object 126 with a dynamic cache block size 212 as described herein. The sequence object 126 is preferably stored in the database data 125. The database data 125 may be used to store sequence object historical information 129. Alternatively, the sequence object historical information may be stored in another suitable location. The database data 125 may also include a table 214 for a sequence object 126 as described in the example below.

Again referring to FIG. 2, the system 200 uses a sequence object with a dynamic cache block size to improve performance and save storage space in the database. The job 128 or the application 127 includes a sequence object statement that creates a sequence object with a dynamic cache block size and an optional seed value as described further below. When the job 128 executes a query that uses the created sequence object and exhausts the sequence object values in the cache previously allocated, the sequence object manager 124 determines a new dynamic cache block size for the sequence object to optimize performance and storage space. The sequence object manager then allocates additional values to the cache for the sequence object where the number of values added to the cache is the new dynamic cache block size. The sequence object manager 124 then updates the sequence object historical information 129 for use the next time the allocated sequence object cache is exhausted.

Figure 3A:
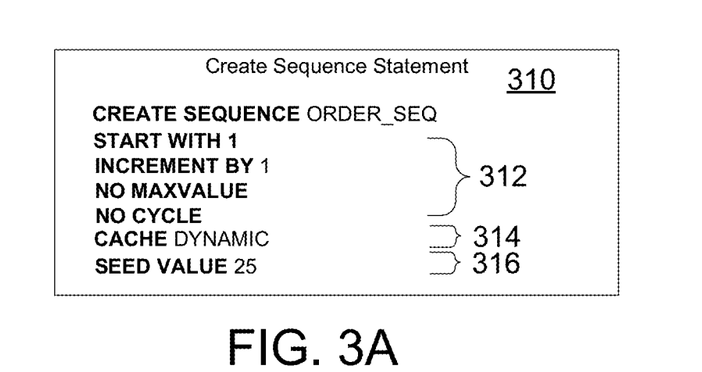
FIGS. 3A-D illustrate an example of using a sequence object with a dynamic cache block size.
Figure 3B:
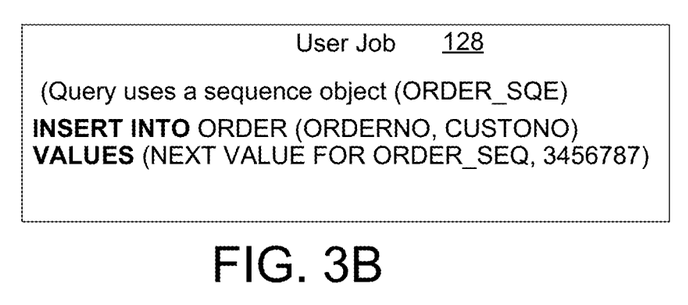
Figure 3C:
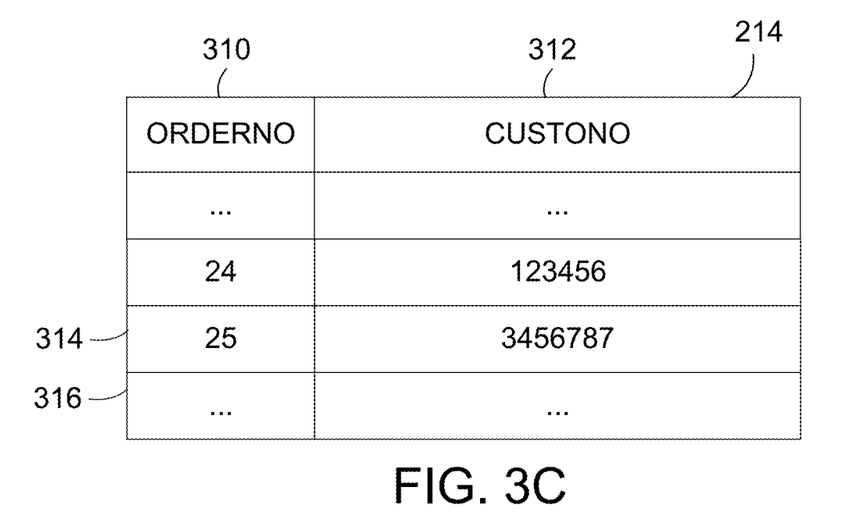

FIGS. 3A-3C illustrate an example of using a sequence object with a dynamic cache block size. FIG. 3A shows an example of a create sequence statement 310 in SQL. In this example, the create sequence statement 310 creates a sequence object named "ORDER_SEQ". The create sequence statement 310 includes some parameters 312 that are known in the prior art. These parameters 312 include INCREMENT BY, NO MAXVALUE and NO CYCLE. In addition, the sequence statement 310 includes a new version of the CACHE parameter 314. The value for the CACHE parameter 314 is "DYNAMIC". In contrast, the prior art value for the CACHE parameter was limited to a number.

Again referring to FIG. 3A, the create sequence statement 310 includes a SEED VALUE parameter 316. The SEED VALUE parameter 316 is optional. The SEED VALUE parameter 316 includes a numeric value that indicates a seed or start value for the database system to use for an initial cache value for the sequence object created by the create sequence statement 310. In this example, the SEED VALUE parameter 316 includes a numeric value of 25. This value indicates to the sequence object manager 124 in the database system 123 to consider starting the cache size for the created sequence object with 25. Upon subsequent calls to the sequence object, the sequence object manager 124 may change the cache size for the created sequence object regardless of the initial value set in the SEED VALUE parameter 316 as described herein.

FIG. 3B illustrates an abbreviated example of a user job 128 that uses a sequence object with a dynamic cache block size. In the illustrated example, the user job 128 uses the sequence object ORDER_SEQ created in FIG. 3A and described above. This example assumes the existence of a table named "ORDER" 214 introduced above in FIG. 2 and shown in more detail in FIG. 3C. The table ORDER 214 has a column for order number 310 called "ORDERNO" and a column for customer number 312 called "CUSTONO". When the query in FIG. 3B executes, the query places values into the table ORDER 214 shown in FIG. 3C. For this example, we assume the current value of the sequence object ORDER_SQE is 24 prior to execution of the query and that the allocated values include 1 through 25. When the query executes the insert statement will place the next value of the ORDER_SEQ sequence object, which is now 25, into the table along with the value "3456787" into the customer number column. Thus the table ORDER 214 will be as shown in FIG. 3C after execution of the query shown in FIG. 3B.

Figure 3D:
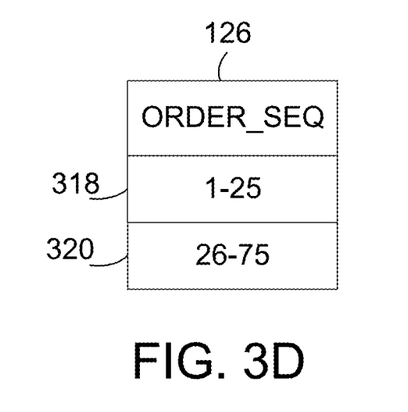

FIG. 3D illustrates dynamically allocating additional sequence numbers to the cache of the sequence object in the above example. After executing the query in the example above, the sequence object ORDER_SEQ reaches its previously set value of 25. With the cache of sequence objects exhausted, the sequence object manager 124 will now need to allocate additional cache values for the sequence object. The sequence object manager 124 may also determine whether to change the number of sequence object values based on sequence object historical information as described herein. In this example in FIG. 3D, the sequence object manager initially allocated cache values of 1 through 25 318 as described above. After exhaustion of these initial values, the sequence object manager determines to dynamically allocate additional cache values of 26 through 75 320.

As introduced above, when a query uses a sequence number and the cache of sequence objects is exhausted, the sequence object manager 124 must allocate additional cache sequence numbers for the sequence object. However, instead of allocating a fixed number of new cache sequence numbers, the sequence object manager calculates a new dynamic block of sequence numbers and dynamically allocates the block of sequence numbers when the CACHE parameter 314 is set to "DYNAMIC" as described above. If this is the first time for allocating the sequence numbers or there is no historical information, the sequence object manager may use the seed value specified in the SEED VALUE parameter of the sequence object create statement described above. If there is historical information available, the sequence object manager 124 gets the appropriate historical information and analyzes it to determine whether to change the number of sequence object cache values to allocate.

Figure 4:
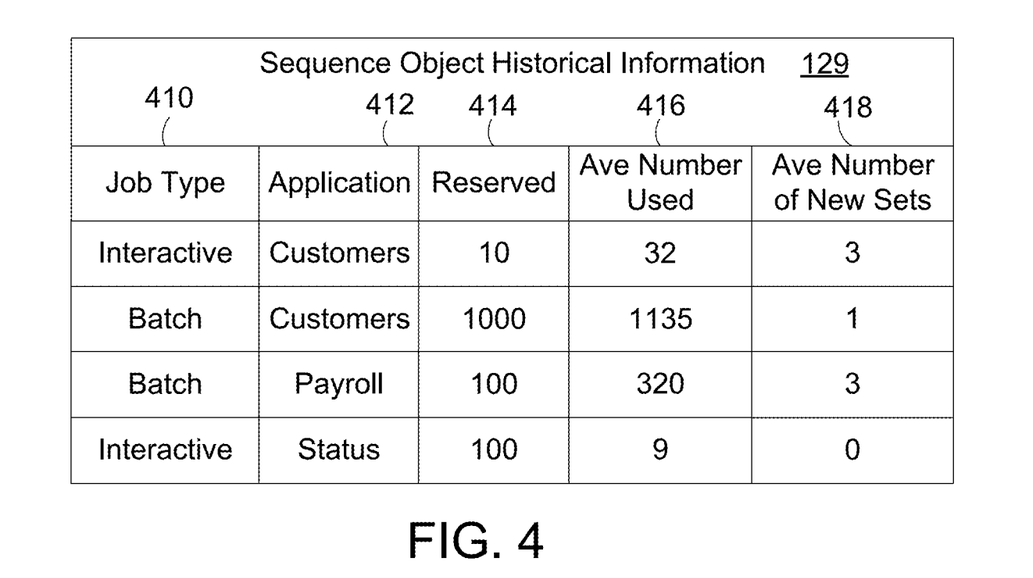
FIG. 4 is an example of a table with historical information for a sequence object.

FIG. 4 illustrates an example of sequence object historical information 129 that can be collected and used by the sequence object manager 124 to determine the number of sequence object cache values to allocate. The sequence object historical information may be obtained by monitoring the use of the sequence object over a period of time by different jobs and applications. In this example, the sequence object historical information 129 includes job type 410, name of the application 412, the number of sequences reserved in the past 414, the average number of sequences typically used by the job or application 416, and the average number of times additional sequence objects were requested in the past 418. The job type may include interactive or batch type jobs.

The sequence object historical information 129 stored in FIG. 4 may be used to determine the block size of sequence object cache values to allocate. Typically, where the average number of new sets is high the block size could be raised and where the average number of new sets is very low the block size could be reduced. For example, the interactive job for the customers application in line 3 of FIG. 4 shows that the average number of sequence objects used was 32 when only 10 were reserved, requiring an average of 3 additional sets to be allocated. In this case, the sequence object manager may determine to increase the number of sequence objects to reserve from 10 to 40. In the interactive job for the status application in line 6 of FIG. 4 shows that the average number of sequence objects used was 9 when 100 were reserved, requiring an average of 0 additional sets to be allocated. In this case, the sequence object manager may determine to decrease the number of sequence objects to reserve from 100 to 10.

The query optimizer may use information available to it to determine the block size of sequence object cache values to allocate. For example, the query optimizer may set the block size for a sequence object based on the number of data records in the database that is accessed by a query to the database. For example, if the database has sales records with 1000 records having a Minnesota address and 10 records with a Wisconsin address, then the query optimizer may reserve 1000 for the sequence object size for a query limited to the state of Minnesota and reserve 10 for the sequence object size for a query limited to the state of Wisconsin.

Figure 5:
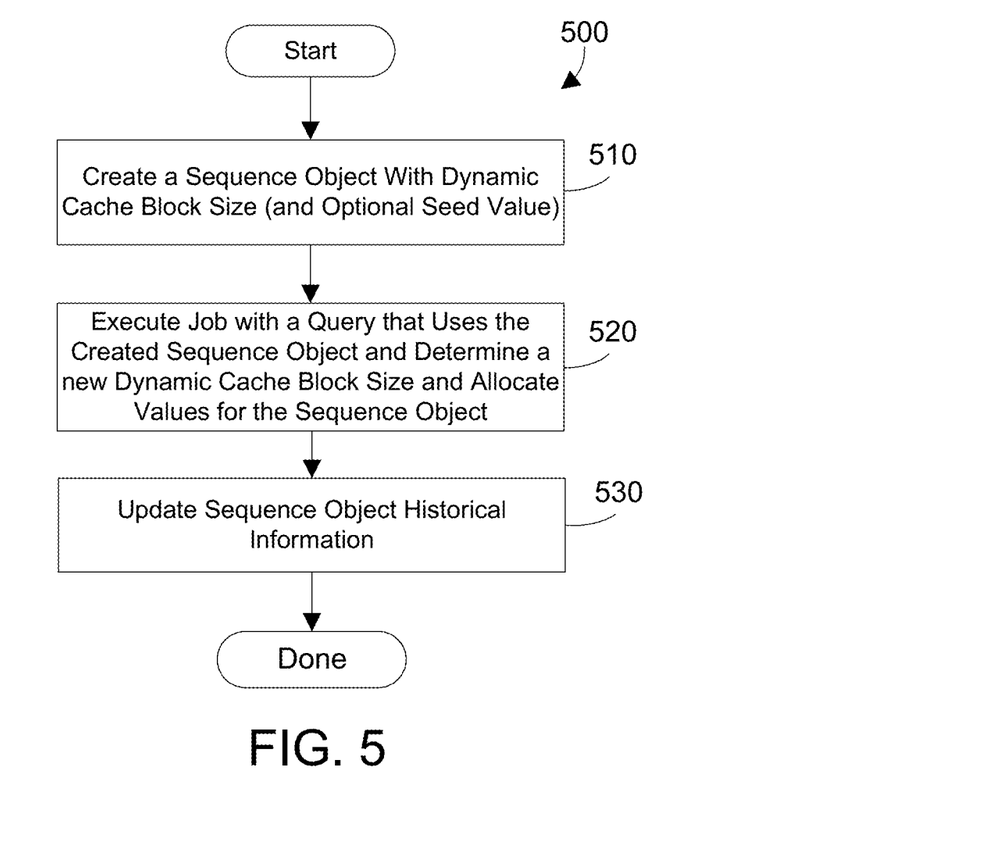
FIG. 5 is a flow diagram of a method for providing a sequence object with a dynamic cache block size.

Referring to FIG. 5, a method 500 shows one suitable example for providing a sequence object with a dynamic cache block size. Portions of method 500 are preferably performed by sequence object manager 124 and the database system 123 shown in FIG. 1. First, in response to a sequence object statement create a sequence object with a dynamic cache block size and an optional seed value (step 510). Next, execute a job with a query that uses the created sequence object and determine a new dynamic cache block size to allocate values for the sequence object (step 520). Note the new dynamic cache block size in step 520 will usually be determined once the existing cache block size is exhausted or nearly exhausted. Update the sequence object historical information (step 530). The method is then done.

Figure 6:
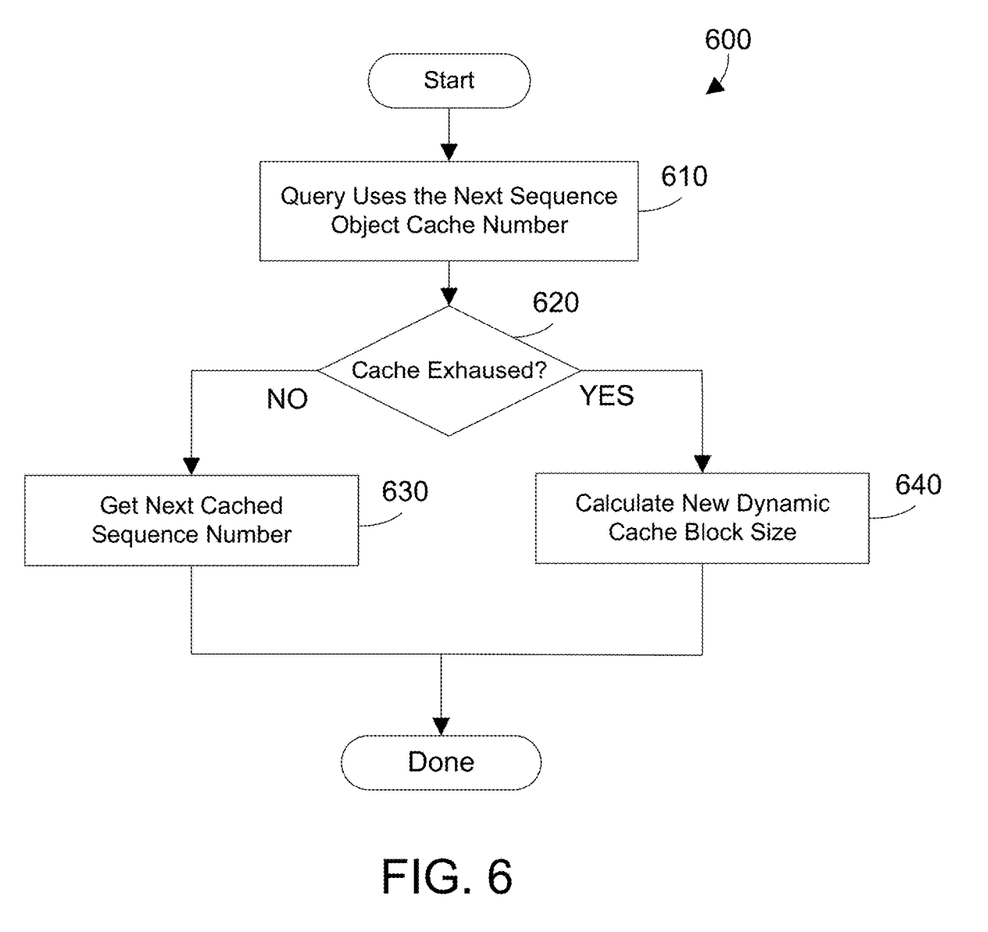
FIG. 6 is a flow diagram of a specific method for step 520 in FIG. 5.

FIG. 6 shows one suitable example of a method 600 to execute a job with a query that uses the created sequence object and to determine a new dynamic block size of sequence object cache numbers. Method 600 thus shows a suitable method for performing step 520 in method 500 in FIG. 5. First, execute a query that uses the sequence object (step 610). If the cache is not exhausted (step 620=no) then get the next cached sequence object number (step 630) and the method is then done. If the cache is exhausted (step 620=yes) then calculate the new dynamic cache block size for the sequence object (step 640) and the method is then done.

While method 600 shown in FIG. 6 does not calculate a new dynamic cache block size until the current cache blocks have been exhausted (see step 620), different conditions could be used within the scope of the disclosure and claims herein. For example, a threshold could be set, and once the number of cache blocks goes below the threshold, a new dynamic cache block size could be calculated in step 640, even if the cache is not yet exhausted. This could be useful in a database system where cache blocks are being rapidly used so the new dynamic cache block size can be determined prior to the cache blocks being exhausted. These and other variations are within the scope of the disclosure and claims herein.

Figure 7:
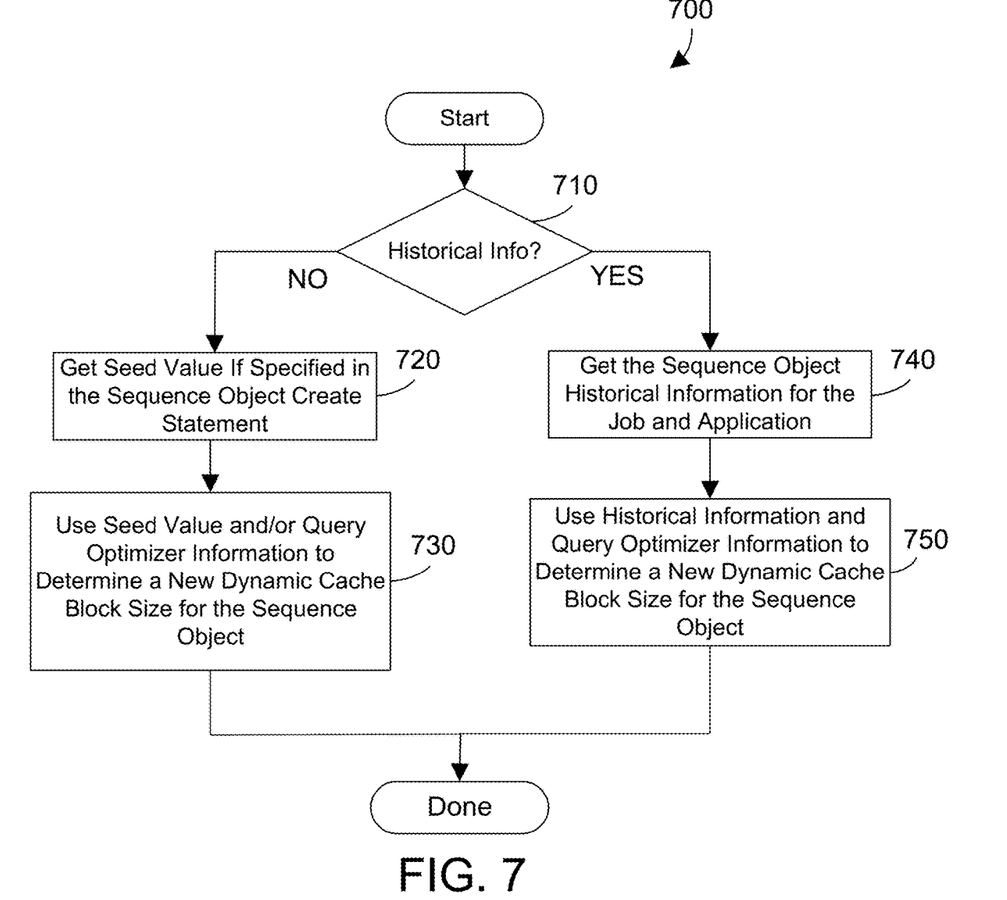
FIG. 7 is a flow diagram of a specific method for step 640 in FIG. 6.

FIG. 7 shows one suitable example of a method 700 to calculate the new dynamic cache block size for the sequence object. Method 700 thus shows a suitable method for performing step 640 in method 600 in FIG. 6. First, determine if there is historical information for the sequence object (step 710). If there is no historical information for the sequence object (step 710=no) then get the seed value if specified in the sequence object create statement (step 720). Use the seed value and/or the optimizer information into account and determine a new cache block size for the sequence object (step 730) and the method is then done. If there is historical information for the sequence object (step 710=yes) then get the historical information for the sequence object used in the job and application (step 740). Then use the historical information and query optimizer information to determine a new dynamic cache block size for the sequence object (step 750) and the method is then done.

The disclosure and claims herein relate to a system and method for a sequence object manager that provides a sequence object with a dynamic cache block size that indicates a dynamic block size for the sequence object. The dynamic block size allows the sequence object manager to optimize performance and storage space depending on applications using the sequence object. The dynamically block size is set and maintained by the sequence object manager based on observed performance and historical trends of the applications. A seed value may be provided by the user to initially set the dynamic block size.

The claims and disclosure herein support a computer apparatus comprising: at least one processor; a memory coupled to the at least one processor; and a database system residing in the memory and executed by the at least one processor that includes a sequence object manager that creates a sequence object with a dynamic cache block size, determines a new dynamic cache block size and allocates a block of cache values with the new dynamic block size to a cache of the sequence object The claims and disclosure herein further support a computer-implemented method executed by at least one processor for providing a database sequence object with a dynamic cache block size comprising: creating a sequence object with a dynamic cache block size; while executing a job with a query that uses the sequence object, determining a new dynamic cache block size and allocating values to a cache of the sequence object according to the new dynamic cache block size.

The claims and disclosure herein further support a computer-implemented method executed by at least one processor for providing a database sequence object with a dynamic cache size comprising: creating a sequence object with a dynamic cache block size based on a seed value parameter indicated in a sequence object create statement; while executing a job with a query that uses the sequence object, determining a new dynamic cache block size based on sequence object historical information wherein the new dynamic cache block size for the sequence object is different than the seed value parameter indicated in the sequence object create statement; allocating values to the cache of the sequence object according to the new dynamic cache block size; and updating the sequence object historical information after executing the query that uses the sequence object.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor; and
a database system residing in the memory and executed by the at least one processor that includes a sequence object manager that:
creates a sequence object with a cache that has a dynamic cache block size; sets a threshold;
determines, when the threshold is reached and before the cache is exhausted, a new dynamic cache block size; and
allocates, before the cache is exhausted, a block of cache values with the new dynamic block size to the cache of the sequence object, wherein the sequence object manager dynamically allocates the new dynamic cache block size for the sequence object based on a seed value parameter indicated in a sequence object create statement and based further on a job type, wherein the job type is an interactive job type or a batch job type.

2. The apparatus of claim 1 wherein the sequence object manager determines the new dynamic block size for the sequence object based on sequence object historical information obtained by monitoring the use of the sequence object over a period of time.

3. The apparatus of claim 2 wherein the sequence object manager updates the sequence object historical information.

4. The apparatus of claim 1 wherein the new dynamic cache block size for the sequence object is different than the seed value parameter indicated in the sequence object create statement.

5. The apparatus of claim 1 wherein the seed value parameter includes a numerical seed value that indicates an initial cache block size for the sequence object.

6. The apparatus of claim 1 wherein the sequence object is created by a sequence object create statement using a structured query language in an application that accesses database data through the database system.

7. A computer-implemented method executed by at least one processor for providing a database sequence object with a dynamic cache block size comprising: creating a sequence object with a cache that has a dynamic cache block size;
setting a threshold; and
while executing a job with a query that uses the sequence object, determining, when the threshold is reached and before the cache is exhausted, a new dynamic cache block size and allocating, before the cache is exhausted, values to the cache of the sequence object according to the new dynamic cache block size, wherein the new dynamic cache block size for the sequence object is based on a seed value parameter indicated in a sequence object create statement and based further on a job type of the job, wherein the job type is an interactive job type or a batch job type.

8. The method of claim 7 wherein the new dynamic block size for the sequence object is based on sequence object historical information obtained by monitoring the use of the sequence object over a period of time.

9. The method of claim 8 further comprising updating the sequence object historical information after executing the query that uses the sequence object.

10. The method of claim 7 wherein the new dynamic cache block size for the sequence object is different than the seed value parameter indicated in the sequence object create statement.

11. The method of claim 7 wherein the seed value parameter includes
a numerical seed value that indicates an initial cache block size for the sequence object.

12. The method of claim 7 wherein the steps are performed by a database system.

13. The method of claim 7 wherein the sequence object is created by a sequence
object create statement using a structured query language in an application that accesses database
data through the database system.

14. A computer-implemented method executed by at least one
processor for providing a database sequence object with a dynamic cache size comprising:
creating a sequence object with a cache that has a dynamic cache block size based on a seed value parameter indicated in a sequence object create statement;
setting a threshold;
while executing a job with a query that uses the sequence object, determining, when the threshold is reached and before the cache is exhausted, a new dynamic cache block size based on sequence object historical information including a job type of the job, wherein the new dynamic cache block size for the sequence object is different than the seed value parameter indicated in the sequence object create statement and wherein the job type is an interactive job type or a batch job type;

allocating, before the cache is exhausted, values to the cache of the sequence object according to the new dynamic cache block size; and updating the sequence object historical information after executing the query that uses the sequence object.

15. The method of claim 14 wherein the seed value parameter includes a numerical seed value that indicates an initial cache block size for the sequence object.

16. The method of claim 14 wherein the steps are performed by a database system.

17. The method of claim 14 wherein the sequence object is created by a sequence object create statement using a structured query language in an application that accesses a database data through the database system.

* * * * *